(12) United States Patent
Whitbread et al.

(10) Patent No.: US 8,916,874 B2
(45) Date of Patent: Dec. 23, 2014

(54) SACRIFICIAL WAVEGUIDE TEST STRUCTURES

(75) Inventors: Neil David Whitbread, Towcester (GB); Lloyd Nicholas Langley, Wootton (GB); Andrew Cannon Carter, Bilsworth (GB)

(73) Assignee: Oclaro Technology Limited, Northhamptonshire (GB)

( * ) Notice: Subject to any disclaimer, the term of this patent is extended or adjusted under 35 U.S.C. 154(b) by 0 days.

(21) Appl. No.: 13/259,572

(22) PCT Filed: Mar. 30, 2010

(86) PCT No.: PCT/IB2010/000716
§ 371 (c)(1),
(2), (4) Date: Jan. 10, 2012

(87) PCT Pub. No.: WO2010/113015
PCT Pub. Date: Oct. 7, 2010

(65) Prior Publication Data
US 2012/0104389 A1    May 3, 2012

Related U.S. Application Data

(60) Provisional application No. 61/165,606, filed on Apr. 1, 2009.

(51) Int. Cl.
*H01L 23/544* (2006.01)
*G01M 11/00* (2006.01)
*G02B 6/12* (2006.01)

(52) U.S. Cl.
CPC ..... *G01M 11/00* (2013.01); *G02B 2006/12166* (2013.01); *G01M 11/33* (2013.01)
USPC .............. 257/48; 257/E23.179; 257/E21.528; 438/7

(58) Field of Classification Search
USPC .............................. 257/48, E23.179, E21.528
See application file for complete search history.

(56) References Cited

U.S. PATENT DOCUMENTS 4,828,358 A * 5/1989 Blonder .......................... 385/18
6,668,000 B2 * 12/2003 Choa .......................... 372/43.01

(Continued)

FOREIGN PATENT DOCUMENTS

| GB | 2387479 | * 10/2003 | ............. H01L 21/66 |
| GB | 2387479 A | 10/2003 | |
| JP | H04-373192 A | 12/1992 | |
| WO | 03056668 A1 | 7/2003 | |

OTHER PUBLICATIONS

PCT/IB2010/000716 International Preliminary Report on Patentability (Oct. 13, 2011).

(Continued)

*Primary Examiner* — Kevin M Picardat
*Assistant Examiner* — Paul Patton
(74) *Attorney, Agent, or Firm* — Fenwick & West LLP

(57) ABSTRACT

Sacrificial optical test structures are constructed upon a wafer of pre-cleaved optical chips for testing the optical functions of the pre-cleaved optical chips. The sacrificial optical structures are disabled upon the cleaving the optical chips from the wafer and the cleaved optical chips can be used for their desired end functions. The test structures may remain on the cleaved optical chips or they may be discarded.

20 Claims, 6 Drawing Sheets

(56) References Cited

U.S. PATENT DOCUMENTS

| | | | |
|---|---|---|---|
| 7,078,671 B1 * | 7/2006 | Sherrer | 250/216 |
| 7,180,929 B2 * | 2/2007 | Kuzma | 372/96 |
| 2003/0199109 A1 * | 10/2003 | Kuzma | 438/16 |
| 2004/0184156 A1 | 9/2004 | Gunn, III et al. | |

OTHER PUBLICATIONS

European Patent Application No. 10716621.7 Official Action dated Aug. 8, 2012.

International search report for application No. PCT/IB2010/000716 dated Jul. 7, 2010.

European Patent Office, Communication Pursuant to Article 94(3) EPC, European Patent Application No. 10 716 621.7, Mar. 21, 2013, 6 pages.

Japanese Patent Office, Notice of Reasons for Rejection, Communication Pursuant to Japanese Patent Law Articles 29(1), 29(2), and 36, Japanese Patent Application No. 2012-502827, Jul. 30, 2013, 7 pages.

State Intellectual Property Office, P.R. China, First Office Action, Chinese Patent Application No. 201080023998.7, Sep. 10, 2013, 26 pages.

European Patent Office, Communication Pursuant to Article 94 (3) EPC, European Patent Application No. 10 716 621.7, Oct. 4, 2013, 4 pages.

Second Office Action for Chinese Patent Application No. CN 201080023998.7, Jul. 22, 2014, 17 pages.

* cited by examiner

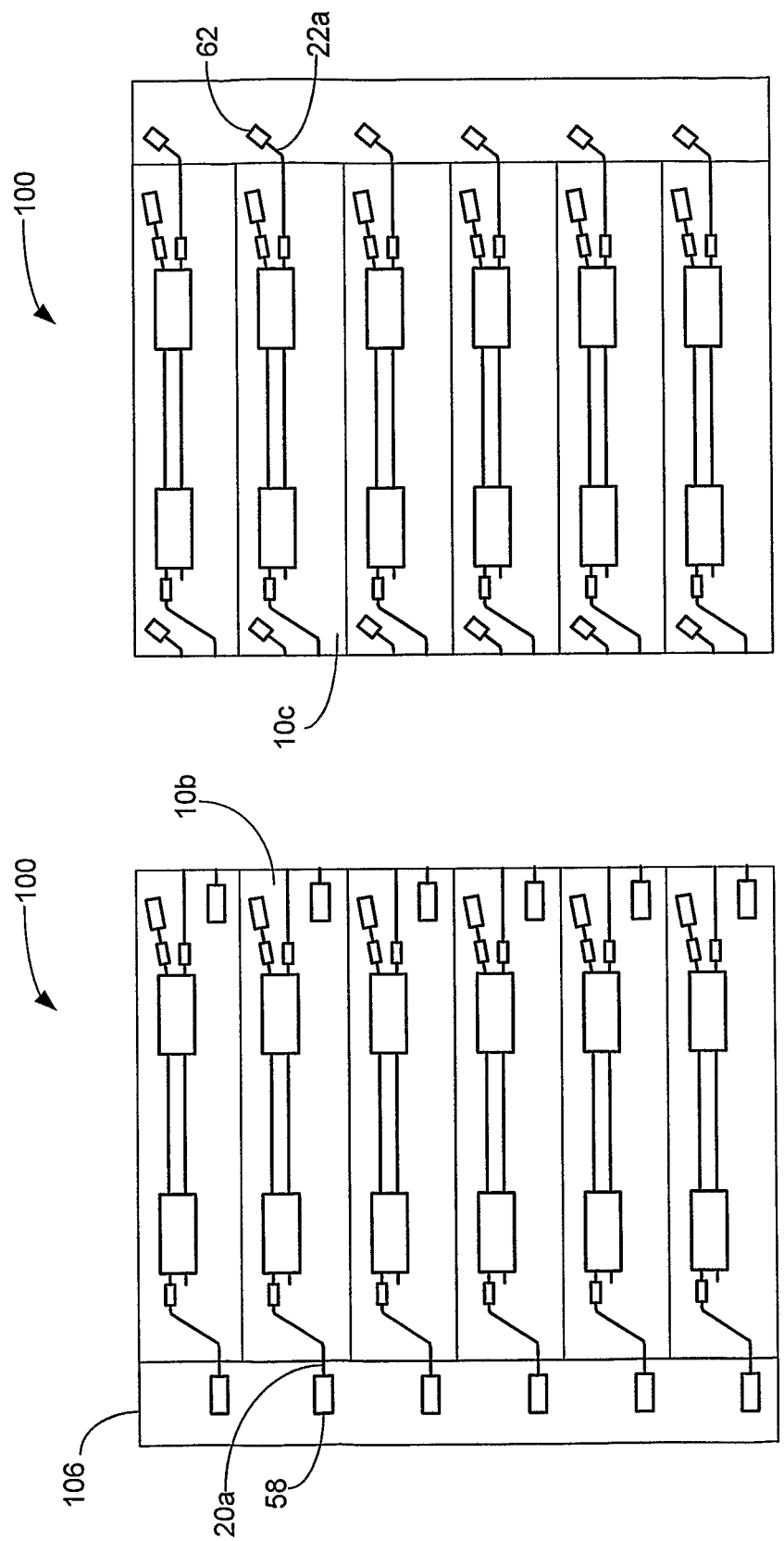

SACRIFICIAL WAVEGUIDE TEST STRUCTURES

RELATED APPLICATION DATA

This application claims the benefit of U.S. Provisional Patent Application No. 61/165,606 filed Apr. 1, 2009 which is incorporated herein by reference in its entirety.

TECHNICAL FIELD

The present invention relates generally to test structures for optical chips, and in particular to sacrificial test structures for testing the optical functionality of optical chips while still in wafer form.

BACKGROUND

Optical chips, also known as photonic integrated circuits, are devices suitable for performing various functions on one or more optical signals.

Individual optical chips are commonly produced by constructing a plurality of optical chips on a semiconductor wafer substrate and cleaving the wafer into a plurality of individual optical chips. Typically the optical chips are designed and laid out on the wafer with little or no consideration of relationship of one chip to the other while still in wafer form.

In many instances it is desirable that the individual optical chips are tested for their intended use or function. Testing of the individual optical chips is typically performed after the optical chips have been cleaved from the wafer. But the testing of cleaved optical chips is time consuming and costly.

The testing of individual optical chips while they are still in wafer form has been contemplated. For example, US Patent Application Publication No. US2004/0013359 discusses the use of an optical probe that is optically coupled to the optical chip at an access point. In principle, such testing enables earlier testing of the optical chips in the production cycle. But utilizing an optical probe in the individual testing of the optical chips still requires considerable alignment time. Furthermore, testing optical chips with the optical probe together with a necessary electrical probe provides practical difficulties in implementation.

In some cases, components built into an optical chip can be used to test the functionality of that optical chip. For example, a photodiode that is to be used in the finished product could be used to test the performance of the optical chip while still in wafer form. However, a typical optical device such as an optical transmitter or modulator generates a high power optical output, and an on-chip photodiode would be placed on a tap. As a result, the on-chip photodiode only receives a small proportion of the output light. Such use of an on-board photodiode does not enable a full set of optical tests on the wafer, including a full power test.

SUMMARY OF INVENTION

The present invention provides a wafer from which a plurality of optical chips are cleaved, wherein sacrificial test structures are provided on the wafer for testing the optical functionality of the optical chips. The sacrificial test structures allow for the simultaneous testing of multiple optical chips while in wafer form, and are disabled upon cleaving the optical chips from the wafer. The sacrificial test structures of a given optical chip may be arranged on the wafer such that they are located on one or more adjacent optical chips, or such that they are located on a discardable portion of the wafer. The present invention overcomes the conventional problems of alignment time and allows for a full range of optical tests to be conducted on the circuitry of the optical chips while they are in wafer form.

According to one aspect of the invention, a wafer from which a plurality of optical chips are cleaved, each optical chip being configured to perform a corresponding optical function, includes: a first optical chip among the plurality of optical chips; and a sacrificial test structure for testing the optical function of the first optical chip or an adjoining optical chip on the wafer, the sacrificial test structure being arranged on the wafer such that at least a portion of the sacrificial test structure is severed from the first optical chip upon cleaving the first optical chip from the wafer.

According to one embodiment, the at least a portion of the sacrificial test structure is arranged on a second optical chip among the plurality of optical chips on the wafer. According to another embodiment, the second optical chip is adjacent the first optical chip. According to another embodiment, the second optical chip is laterally offset from the first optical chip.

According to another embodiment, at least another portion of the sacrificial test structure is arranged on a third optical chip among the plurality of optical chips on the wafer. According to another embodiment, the third optical chip is adjacent the first optical chip. According to another embodiment, the third optical chip is laterally offset from the first optical chip.

According to another embodiment, at least another portion of the sacrificial test structure is arranged on a discardable portion of the wafer.

According to another embodiment, the at least a portion of the sacrificial test structure is arranged on a discardable portion of the wafer.

According to another embodiment, the sacrificial test structure includes at least a portion of one or more waveguides.

According to another embodiment, the sacrificial test structure includes at least one light source. According to another embodiment, the light source is at least one of a laser or a waveguide grating According to another embodiment, the sacrificial test structure includes at least one receiver. According to another embodiment, the receiver is at least one of a photodiode, optical power monitor, or wavelength monitor.

According to another aspect of the invention, an optical chip cleaved from a wafer from which a plurality of optical chips are cleaved, the optical chip being configured to perform an optical function, includes: circuitry for performing the optical function; and at least a portion of a sacrificial test structure for testing the optical function of the circuitry of the optical chip or an adjoining optical chip prior to the optical chip being cleaved from the wafer.

According to one embodiment, the sacrificial test structure includes at least one of a light source, receiver, or severed portion of a waveguide.

According to another aspect of the invention, a method of testing and processing a first optical chip among a plurality of optical chips on a wafer, each optical chip being configured to perform a corresponding optical function, includes: contacting a sacrificial test structure for testing the properties of the first optical chip or an adjoining optical chip on the wafer, the sacrificial test structure being arranged on the wafer; controlling and monitoring the sacrificial test structure; and cleaving the first optical chip from the wafer such that at least a portion of the sacrificial test structure is severed from the first optical chip upon cleaving the first optical chip from the wafer.

According to one embodiment, the at least a portion of the sacrificial test structure is arranged on at least one of a second optical chip among the plurality of optical chips on the wafer or a discardable portion of the wafer.

According to another embodiment, the sacrificial test structure includes at least a portion of one or more waveguides.

According to another embodiment, the sacrificial test structure includes at least one light source and at least one receiver.

The foregoing and other features of the invention are hereinafter described in greater detail with reference to the accompanying drawings.

BRIEF DESCRIPTION OF THE DRAWINGS

FIG. 2B is a schematic diagram of a column of optical chips on an exemplary wafer in accordance with the invention.

FIG. 2C is a schematic diagram of a column of optical chips on an exemplary wafer in accordance with the invention.

DESCRIPTION

Figure 1:
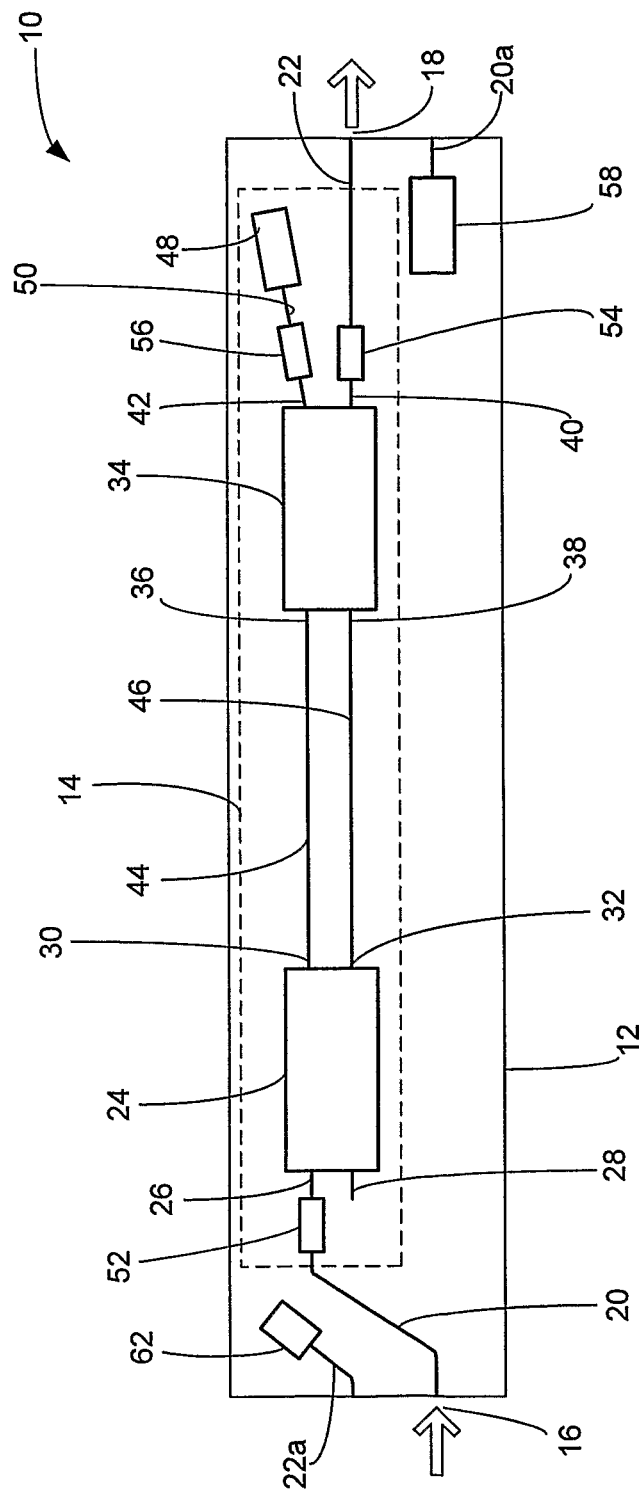
FIG. 1 is a schematic diagram of an individual optical chip cleaved from a wafer in accordance with the invention.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Referring now in detail to the drawings and initially to FIG. 1, a schematic diagram of an individual optical chip that has been cleaved from a wafer is shown generally at 10.

The substrate 12 of the optical chip 10 (and the wafer from which the optical chip is formed) may be constructed from indium phosphide. Indium phosphide is used herein as an exemplary material because it is a semiconductor material that allows for a range of optical devices such as lasers, photodiodes, couplers, modulators and the like to be readily constructed and integrated thereon. But the wafer and chip substrate 12 may also be constructed from any other suitable substrate material, such as, for example, gallium arsenide, indium gallium arsenide, indium gallium arsenide phosphide, etc.

The optical chip 10 includes circuitry 14 that is designed for performing the intended functionality of the optical chip 10. In this exemplary embodiment, the circuitry 14 functions as a Mach-Zehnder modulator and is suitable for use in, for example, optical telecommunications. While the components of the circuitry 14 will be described chiefly in this context, it is to be understood that the design of the circuitry 14 may be any other suitable design, and the circuitry 14 may perform any other suitable desired function. The particular functionality of the optical chip 10 is not germane to the invention in its broadest sense.

The optical chip 10, when in its cleaved form, includes an input 16 for inputting light to the circuitry 14, and an output 18 for outputting light from the circuitry 14. The input 16 is coupled to the circuitry 14 via waveguide 20 and output 18 is coupled to the circuitry 14 via waveguide 22. As used herein, a waveguide is a structure for guiding waves, in this case optical waves (signals). Waveguides may be formed on the optical chip 10 using any method commonly known in the art. For example, waveguides may be fabricated by the well-known methods of epitaxial growth and semiconductor etching.

The basic structure of the Mach-Zehnder modulator circuitry 14 includes multi-mode interference (MMI) couplers 24 and 34. MMI couplers 24 and 34 are of a standard design and are implemented within existing process design rules known in the art. As used in this exemplary embodiment, MMI couplers 24 and 34 are 2×2 MMI couplers. MMI coupler 24 includes inputs 26 and 28 and outputs 30 and 32. MMI coupler 34 includes inputs 36 and 38 and outputs 40 and 42. Input 26 of MMI coupler 24 is coupled to input 16 via waveguide 20 and input 28 is unused. However, waveguide 20 may instead be coupled to input 28, and input 26 may not be used. The outputs 30 and 32 of MMI coupler 24 are coupled to respective ones of inputs 36 and 38 of MMI coupler 34. More particularly, output 30 is coupled to input 36 via waveguide 44, and output 32 is coupled to input 38 via waveguide 46. Output 40 of MMI coupler 34 is coupled to output 18 via waveguide 22. Output 42 of MMI coupler 34 is coupled to a full absorbing light detector 48 via waveguide 50. The full absorbing light detector 48 is also referred to as a complementary output, and may be used in the testing of the Mach-Zehnder modulator circuitry 14. Such testing may be performed when the optical chip 10 is still in wafer form, or subsequent to the optical chip 10 being cleaved from the wafer.

Optional tap detectors 52, 54, and 56 are respectively located along waveguides 20, 22, and 50. Each tap detector 52, 54, and 56 is capable of tapping and detecting a small proportion of light from the respective waveguides. Tap detector 56 may also be referred to as a complementary tap because it is associated with the complementary output. The tap detectors may be used, for example, in conjunction with the use of the optical chip 10 in optical telecommunications.

Figure 2A:
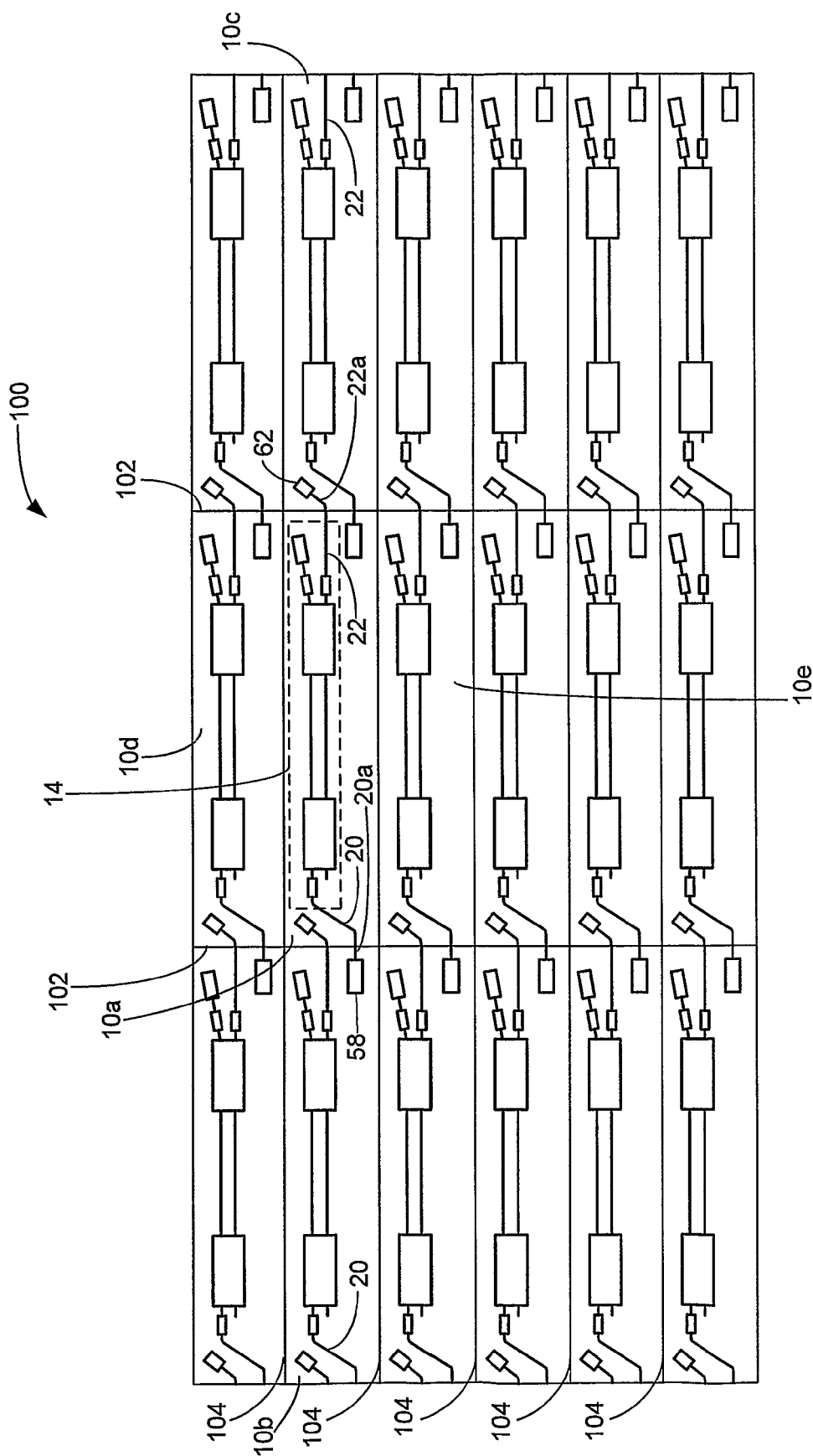
FIG. 2A is a schematic diagram of an exemplary wafer having a plurality of optical chips in accordance with the invention.

With reference to FIG. 2A, a wafer 100 is illustrated as including a plurality of pre-cleaved optical chips 10 (e.g., 10a, 10b, 10c, etc.) arranged in columns and rows, wherein columns and rows of chips 10 are defined by intersecting vertical cleave lines 102 and horizontal cleave lines 104. The cleave lines 102 and 104 of FIG. 2 form three columns and six rows of optical chips on the wafer 100, but a wafer in accordance with the present invention is not to be limited to this particular number of columns and rows. That is, the illustrated wafer 100 may be but an exemplary portion of a whole wafer. Alternatively, a wafer in accordance with the present invention may include fewer columns and/or rows than illustrated in FIG. 2A.

The pre-cleaved optical chips included on the wafer 100 each possess the same configuration (i.e., the configuration illustrated in FIG. 1). However, the optical chips on the wafer 100 may differ from one another. For example, the optical chips in a first column may have a different configuration from those chips in a second column. It is also possible that one or more elements present on one optical chip may be omitted from one or more of the other optical chips on the wafer 100.

Prior to being cleaved from the wafer, a given optical chip 10 is adjoined to one or more other optical chips 10. For example, optical chip 10a is adjoined at its lateral ends to optical chips 10b and 10c, and is adjoined at its longitudinal ends by optical chips 10d and 10e, respectively.

One or more sacrificial test structures for testing the circuitry of the optical chips are included on the wafer. In the embodiment illustrated in FIG. 2A, the sacrificial test structures for testing a given optical chip 10 (e.g., optical chip 10a) are arranged on the wafer such that they are included on one or more adjacent optical chips (e.g., optical chips 10b and 10c) when in wafer form. Once the optical chips 10 are cleaved from the wafer, as illustrated in FIG. 1, the sacrificial test structures for the cleaved optical chips 10 are disabled.

The sacrificial test structures may include a light source 58 for outputting light to circuitry 14 of an adjacent optical chip. In one embodiment, light source 58 may be a laser. In another embodiment the light source 58 may be a waveguide grating for receiving an off-chip light source. The light source 58 is illustrated as providing light to the circuitry 14 of a single adjacent optical chip. However, the light source 58 may also provide light to the circuitry 14 of more than one optical chip using a series of optical splitters and waveguides (not illustrated).

Light source 58 is coupled to circuitry 14 of an adjacent optical chip via waveguide 20 of the adjacent optical chip. More particularly, when in wafer form, waveguide 20 includes a sacrificial portion 20a that is part of the sacrificial test structure and is coupled to the light source 58. That is, prior to cleaving the optical chips from the wafer 10, sacrificial waveguide 20a actually forms a portion of waveguide 20 of the adjacent chip, the waveguide running contiguously across vertical cleave line 102. When the optical chips are cleaved from the wafer 100, the sacrificial portion 20a is severed from waveguide 20, thereby decoupling light source 58 from the circuitry 14 of the adjacent optical chip.

The sacrificial test structures may also include one or more receivers 62 for receiving, monitoring, and/or measuring the light output from the circuitry 14 of an adjacent optical chip under testing. In one embodiment, receiver 62 is a photodiode, optical power monitor, and/or wavelength monitor.

Receiver 62 is coupled to circuitry 14 of an adjacent optical chip via waveguide 22 of the adjacent optical chip. When in wafer form, waveguide 22 includes a sacrificial portion 22a that is part of the sacrificial test structure and is coupled to the receiver 62. That is, prior to cleaving the optical chips from the wafer 100, sacrificial waveguide 22a actually forms a portion of waveguide 22 that runs contiguously across vertical cleave line 102. When the optical chip is cleaved from the wafer 100, the sacrificial portion 22a is severed from waveguide 22, thereby decoupling receiver 62 from the circuitry 14 of the adjacent optical chip.

The arrangement of the sacrificial test structures is not intended to be limited to the embodiment illustrated in FIGS. 1 and 2A. The sacrificial test structures may be arranged in any suitable manner that allows for the on-chip testing of a given pre-cleaved optical chip using elements on the wafer 100 that extend beyond the bounds of that optical chip. For example, sacrificial test structures may be located on a neighbouring or adjoining optical chip such that sacrificial portion 20a or 22a of waveguides 20 or 22 may cross cleave line 104.

Sacrificial portion 20a or 22a of waveguides 20 or 22 may also cross more than one cleave line 102 or 104.

Additionally, although the sacrificial test structures are described above as being coupled to circuitry 14 of an adjacent optical chip via waveguides 20 and 22 of the adjacent optical chip, it is also contemplated that the sacrificial test structures may be coupled to one or more components of the circuitry 14 of the adjacent optical chip 10 via one or more sacrificial waveguides that are independent of waveguides 20 and 22 (not illustrated). Upon cleaving the optical chips from the wafer, a portion of the sacrificial test features (i.e., a portion of the sacrificial waveguides) would remain on the adjacent optical chip.

With continued reference to FIGS. 1 and 2A, a testing procedure of the circuitry 14 of optical chip 10a is herein described. The testing procedure allows for the testing of some or all of the optical chips on the wafer to be performed concurrently. In one embodiment, the testing of the optical chips is simultaneous. In the testing procedure, the pre-cleaved optical chips may be tested using a testing apparatus (not illustrated). One or more electrodes of the testing apparatus may be in contact with the light source 58 of optical chip 10b, and light source 58 may be activated and/or controlled by the testing apparatus. Light generated by light source 58 may pass to the circuitry of adjacent optical chip 10a via waveguide 20a and 20. Light is output from the circuitry 14 of optical chip 10a to the receiver 62 of adjacent optical chip 10c via waveguide 22 and 22a. The receiver 62 may also be in contact with one or more electrodes of the testing apparatus, and the testing apparatus may monitor and record the optical signals received by the receiver 62 during testing. Where the circuitry 14 forms a Mach-Zehnder modulator, as in this exemplary embodiment, the light output from circuitry 14 may also be received by full absorbing light detector 48 on optical chip 10a via waveguide 50. Full absorbing light detector 48 may also be in contact with the test apparatus, and received light may be monitored.

On-wafer testing may still be performed on those chips that do not include an adjacent optical chip at both of its lateral ends. For example, the optical chips in FIG. 2A that are located in the same column as optical chip 10b may be located at an end of the wafer 100 and therefore not have a column of optical chips adjacent their lateral end proximal to waveguide 20. Similarly, optical chips located in the same column as optical chip 10c may also be located at an end of the wafer 100 and therefore not have a column of optical chips adjacent their lateral end proximal to waveguide 22. In such a situation, the wafer 100 may include a discardable portion that includes one or more sacrificial test structures. FIG. 2B illustrates an embodiment where a discardable portion 106 of wafer 100 includes a light source 58 and sacrificial portion 20a of waveguide 20. FIG. 2C illustrates an embodiment where a discardable portion 108 of wafer 100 includes a receiver 62 and sacrificial portion 22a of waveguide 22. Furthermore, as illustrated in this embodiment, receiver 62 and sacrificial portion 22a may be omitted from optical chip 10b and light source 58 and sacrificial portion 20a may be omitted from optical chip 10c because these sacrificial test structures would not be coupled to an adjacent optical chip. Testing may proceed in a manner similar to that described above.

With continued reference to FIG. 2A, after testing the optical chips, the wafer 100 may be cleaved along cleave lines 102 and 104, and the chips may be readily triaged according to performance results from the on-wafer testing. As a result of this process, faulty chips may be identified and discarded upon cleaving. Cleaving the optical chips also separates the sacrificial test structures from the respective waveguides 20 and 22 of adjacent optical chips, thereby disabling the sacrificial test structures. Thus, as illustrated for example at FIG. 1, an optical chip for an application such as an optical transmitter, modulator or receiver may have upon it the whole or portion of a sacrificial test structure that was used for testing the circuitry 14 of adjacent chips when the optical chip was part of a wafer 100.

Figure 3:
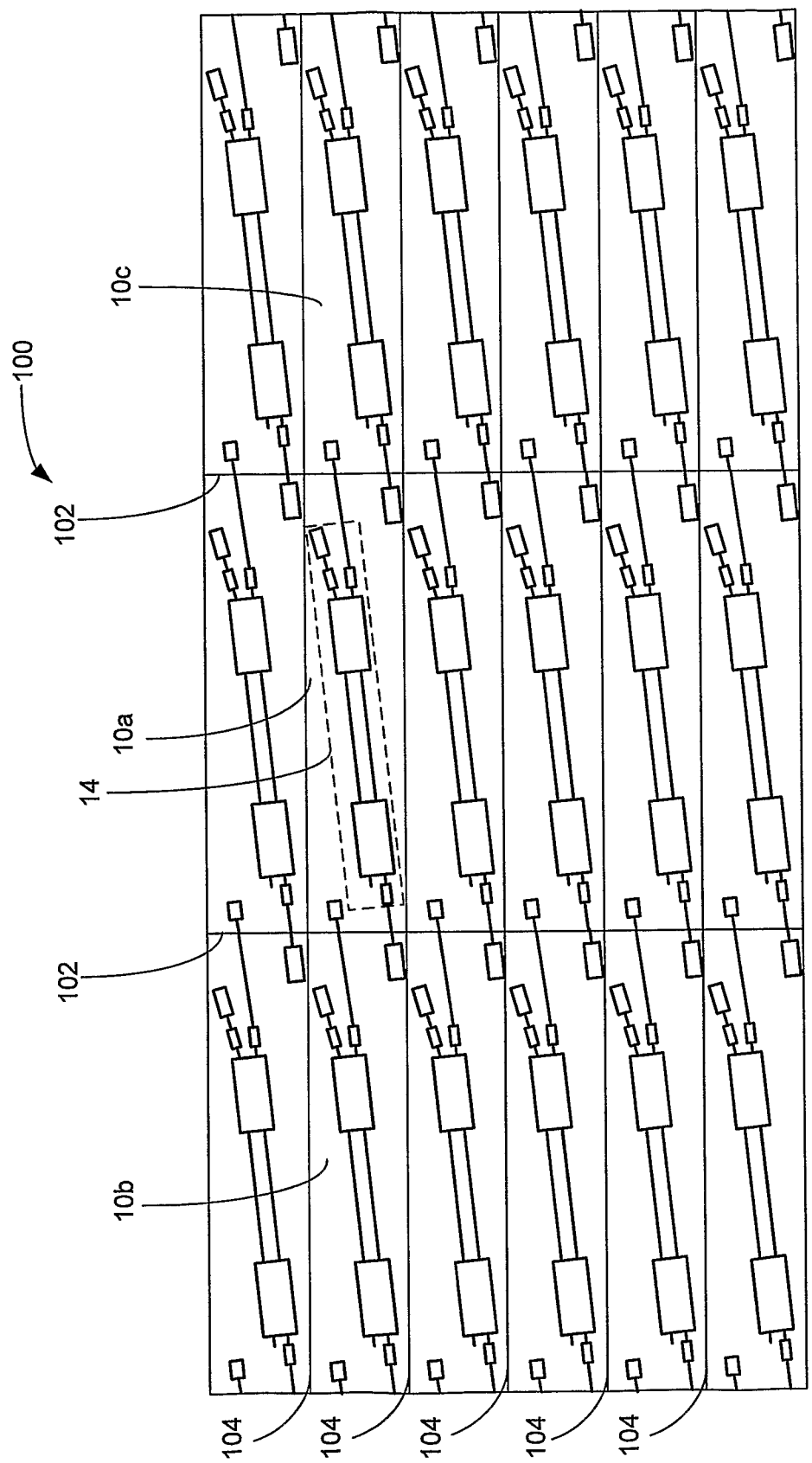
FIG. 3 is a schematic diagram of an exemplary wafer having a plurality of optical chips in accordance with the invention.

In the embodiments of FIGS. 1 and 2A-C, the circuitry 14 of the optical chips is arranged in an orientation that is relatively parallel to the latitudinal direction of the optical chip. But the circuitry 14 of the optical chips may be arranged in any suitable manner. For example, FIG. 3 illustrates a wafer 100 wherein the circuitry 14 of the optical chips is arranged on the chip in a diagonal orientation. Orienting the circuitry 14 diagonally with respect to the chip provides for more efficient use of the occupied area of the optical chip (i.e., "real estate"). Such an orientation also minimizes or eliminates the use of waveguide bends.

Figure 4:
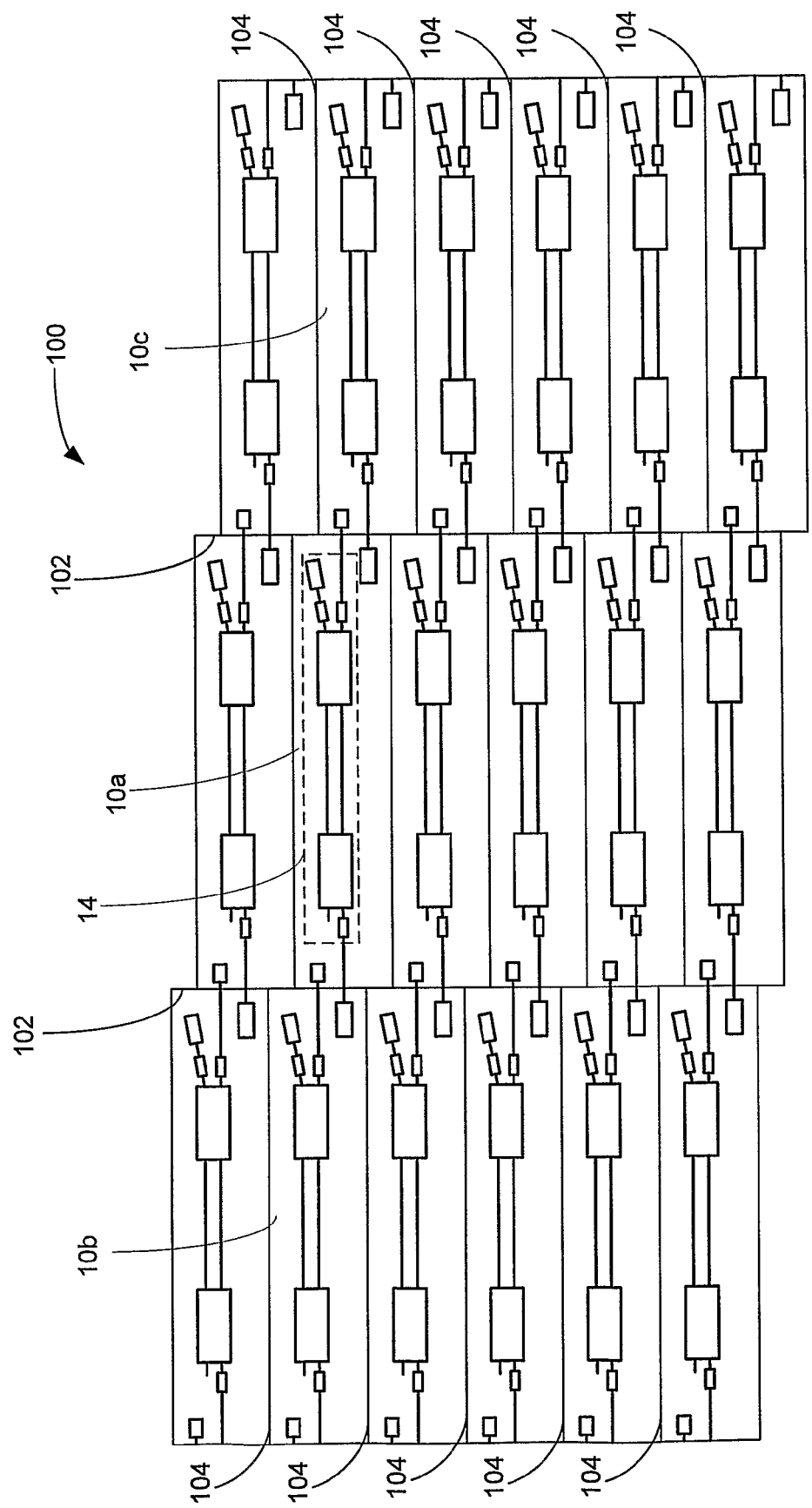
FIG. 4 is a schematic diagram of an exemplary wafer having a plurality of optical chips in accordance with the invention.

The optical chips themselves may also be arranged on the wafer 100 in any suitable manner. For example, FIG. 4 illustrates an exemplary wafer 100 arrangement wherein columns of the optical chips are offset with respect to each other. Offsetting the chips on the wafer by a proportion of the chip width allows the circuitry 14 to be oriented relatively parallel to the latitudinal direction of the optical chip while also minimizing or eliminating bends in the waveguides.

Figure 5:
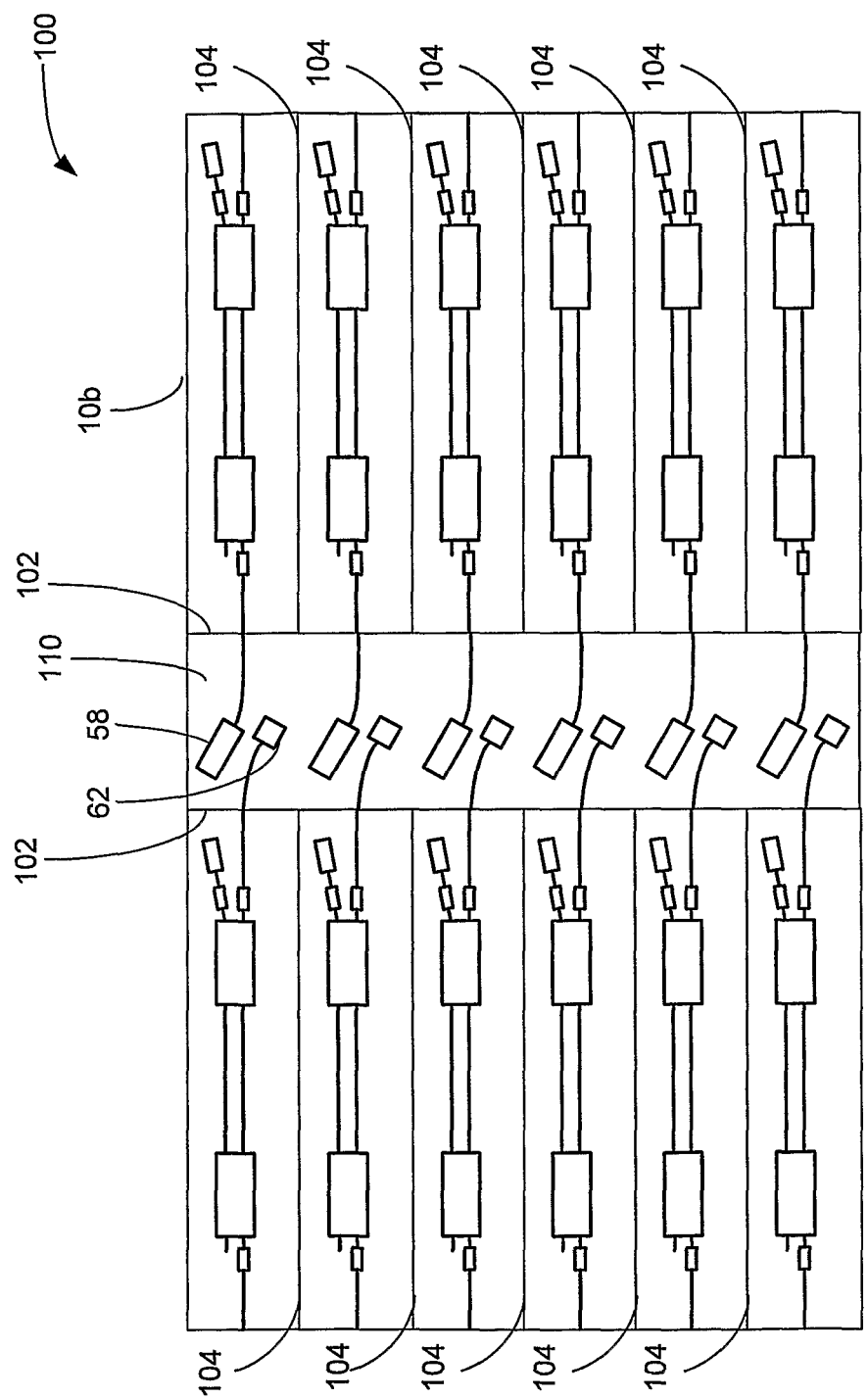
FIG. 5 is a schematic diagram of an exemplary wafer having a plurality of optical chips in accordance with the invention.

The above-described embodiments include the sacrificial test structures are arranged on the wafer such that cleaved optical chips may include the whole or portion of the disabled sacrificial test structures. But the sacrificial test structures may instead be located on a portion of the wafer that is discarded after cleaving, in a manner similar to what is described in relation to FIGS. 2B and 2C. FIG. 5 illustrates an exemplary wafer 100 arrangement wherein the light source 58, the receiver 62, and sacrificial portions 20a and 22a of waveguides 20 and 22, are located on a discardable portion 110 of the wafer. In this embodiment, discardable portion 110 separates the columns of the optical chips. However, discardable portion 110 may be arranged in any suitable manner on the wafer. For example, discardable portion 110 may instead be arranged on the wafer such that it separates the rows of the optical chips. By locating the sacrificial test structures in the discardable portion 110, the sacrificial test structures take up no real estate on the cleaved optical chips. Of course, the orientation of the optical chips and circuitry as discussed in relation to FIGS. 3 and 4 may also be implemented in the embodiment illustrated in FIG. 5.

In the embodiments of FIGS. 3-5, on-wafer testing of the optical chips may proceed as described in relation to FIGS. 1 and 2A-C. The wafer may also be cleaved along lines 102 and 104.

In view of the above, it will be appreciated that the features of the present invention provide for the simultaneous testing of the optical functionality of the optical chips while in wafer form. The features of the present invention minimize alignment time associated with testing of the optical chips, while also allowing for a full range of optical tests to be conducted on the circuitry of the optical chips while in wafer form.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A planar wafer from which a plurality of optical chips are cleaved, each optical chip being configured to perform a corresponding optical function, the wafer including:
    a first optical chip among the plurality of optical chips, the first optical chip comprising a circuitry for performing the corresponding optical function and a plurality of waveguides;
    a sacrificial test structure configured to be contacted, controlled, and monitored for testing the optical function of the first optical chip or an adjoining optical chip on the wafer, the sacrificial test structure being arranged on the wafer such that at least a portion of the sacrificial test structure is severed from the first optical chip upon cleaving the first optical chip from the wafer; and
    a plurality of waveguides that optically couple the circuitry of the first optical chip or an adjoining optical chip to the sacrificial test structure and that are substantially parallel to the plane of the wafer.

2. The wafer according to claim 1, wherein the at least a portion of the sacrificial test structure is arranged on a second optical chip among the plurality of optical chips on the wafer.

3. The wafer according to claim 2, wherein the second optical chip is adjacent the first optical chip.

4. The wafer according to claim 2, wherein the second optical chip is laterally offset from the first optical chip.

5. The wafer according to claim 2, wherein at least another portion of the sacrificial test structure is arranged on a third optical chip among the plurality of optical chips on the wafer.

6. The wafer according to claim 5, wherein the third optical chip is adjacent the first optical chip.

7. The wafer according to claim 5, wherein the third optical chip is laterally offset from the first optical chip.

8. The wafer according to claim 2, wherein at least another portion of the sacrificial test structure is arranged on a discardable portion of the wafer.

9. The wafer according to claim 1, wherein the at least a portion of the sacrificial test structure is arranged on a discardable portion of the wafer.

10. The wafer according to claim 1, wherein the sacrificial test structure includes at least a portion of the plurality of waveguides.

11. The wafer according to claim 1, wherein the sacrificial test structure includes at least one light source.

12. The wafer according to claim 11, wherein the light source is at least one of a laser or a waveguide grating, 13. The wafer according to claim 1, wherein the sacrificial test structure includes at least one receiver.

14. The wafer according to claim 13, wherein the receiver is at least one of a photodiode, optical power monitor, or wavelength monitor.

15. An optical chip cleaved from a planar wafer from which a plurality of optical chips are cleaved, the optical chip being configured to perform an optical function and including:
a circuitry for performing the optical function;
at least a portion of a sacrificial test structure, the sacrificial test structure configured to be contacted, controlled, and monitored for testing the optical function of the circuitry of the optical chip or an adjoining optical chip prior to the optical chip being cleaved from the wafer; and
a plurality of waveguides that optically couple the circuitry of the first optical chip or an adjoining optical chip to the sacrificial test structure and that are substantially parallel to the plane of the wafer.

16. The optical chip according to claim 15, wherein the sacrificial test structure includes at least one of a light source, receiver, or severed portion of a waveguide.

17. A method of testing and processing a first optical chip among a plurality of optical chips on a planar wafer, each optical chip being configured to perform a corresponding optical function, the method including:
contacting a sacrificial test structure for testing the properties of the first optical chip or an adjoining optical chip on the wafer, the sacrificial test structure being arranged on the wafer;
optically coupling the sacrificial test structure to a circuitry of the first optical chip or an adjoining optical chip on the wafer via a plurality of waveguides, wherein the waveguides are substantially parallel to the plane of the wafer;
controlling and monitoring the sacrificial test structure; and
cleaving the first optical chip from the wafer such that at least a portion of the sacrificial test structure is severed from the first optical chip upon cleaving the first optical chip from the wafer.

18. The method according to claim 17, wherein the at least a portion of the sacrificial test structure is arranged on at least one of a second optical chip among the plurality of optical chips on the wafer or a discardable portion of the wafer.

19. The method according to claim 17, wherein the sacrificial test structure includes at least a portion of the plurality of waveguides.

20. The method according to claim 17, wherein the sacrificial test structure includes at least one light source and at least one receiver.

* * * * *